United States Patent [19]

Gusarov et al.

[11] 3,968,769
[45] July 13, 1976

[54] APPARATUS FOR BALANCING ROTORS

[76] Inventors: Anatoly Alexandrovich Gusarov, Unversitetsky prospekt, 5, kv. 470; Lev Nikolaevich Shatalov, ulitsa Utrennyaya, 3, kv. 107, both of Moscow, U.S.S.R.

[22] Filed: Jan. 13, 1975

[21] Appl. No.: 540,665

[52] U.S. Cl. .................................... 118/8; 73/66; 73/468; 118/320
[51] Int. Cl.² ........................................ B05B 15/00
[58] Field of Search .............. 118/8, 9, 320; 73/66, 73/468

[56] References Cited
UNITED STATES PATENTS

| | | | |
|---|---|---|---|
| 2,432,659 | 12/1947 | Criswell | 118/9 |
| 2,731,887 | 1/1956 | Sjöstrand | 118/8 |
| 2,937,613 | 5/1960 | Larsh | 118/9 |
| 3,130,075 | 4/1964 | Larsh | 118/9 |
| 3,408,220 | 10/1968 | Bendix et al. | 118/8 |
| 3,521,598 | 7/1970 | Straw | 118/9 |
| 3,525,843 | 8/1970 | Batterson | 118/8 |

FOREIGN PATENTS OR APPLICATIONS

| | | | |
|---|---|---|---|
| 1,010,543 | 11/1965 | United Kingdom | 118/8 |

*Primary Examiner*—Louis K. Rimrodt
*Assistant Examiner*—Douglas Salser
*Attorney, Agent, or Firm*—Haseltine, Lake & Waters

[57] ABSTRACT

A rotor balancing apparatus comprises a chamber for balancing material, the chamber having a nozzle and being arranged in the field produced by an electromagnetic inductor coupled to a pulse generaor which, in turn, is electrically connected to the output of a control unit. The input of the control unit is connected to a transducer of vibration parameters of the rotor being balanced, as the latter rotates in front of the nozzle of the chamber. As electric pulses are applied to the inductor from the generator, magnetic pulse forces are generated in the chamber, whereby doses of the balancing material are ejected through the chamber's nozzle onto the surface of the rotor being balanced, which takes place at the moment when the "light" point area of the rotor is in front of said nozzle.

7 Claims, 5 Drawing Figures

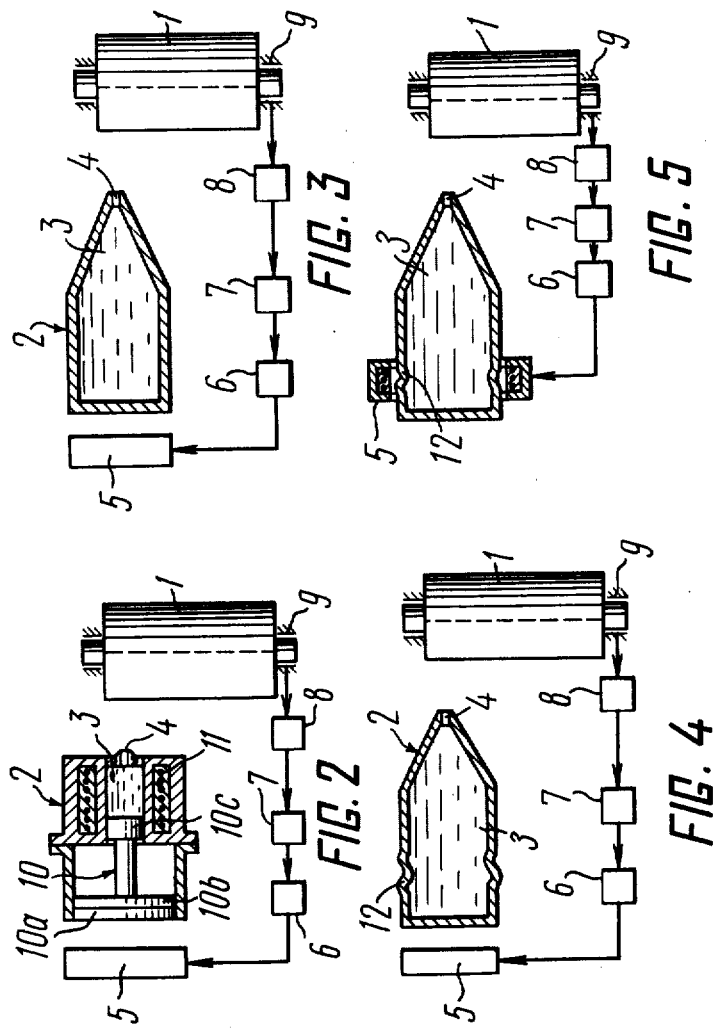

APPARATUS FOR BALANCING ROTORS

The present invention relates to balancing machine and mechanism components and, more particularly, to apparatus for balancing rotors.

The invention is equally applicable to static and dynamic balancing of rotors and is especially advantageous in automatic rotor balancing systems operating under any temperature and atmospheric conditions. The invention is applicable, for example, in machine building for balancing grinding wheels, in power engineering for balancing turbogenerator rotors, and in precision instrument making for balancing gyro rotors.

There is known a method for balancing rotors by means of forced application onto the light point area on the rotor surface of doses of a liquid, fast-hardening balancing substance, which application is carried on until the unbalance magnitude is reduced to a permissible level.

The light point on the surface of a rotor being balanced is a term designating the point at which a balancing load (a balancing material) is attached (applied) to said surface.

The point in question is found on the rotor surface from the vibration parameters of the rotor in the course of its rotation, the magnitude of the balancing load being determined by the unbalance magnitude of the rotor.

There are known apparatus for effecting rotor balancing, wherein the application on the rotor surface of doses of a liquid balancing material is performed by means of exploding metal wire as a result of an electric discharge through that wire, or with the aid of a mechanical device (cf. U.S. Pat. No. 3,130,075, Class 118-8).

An apparatus of the above type comprises a chamber for a balancing material, having a nozzle, means for ejecting doses of said balancing material in liquid state from the chamber's nozzle onto the light point area on the surface of a rotor being balanced in the course of its rotation, and a control unit for controlling said ejection means, which control unit is electrically connected to a transducer of vibration parameters of the rotor.

The chamber of the above apparatus comprises a vessel for the balancing material, and a cylindrical stem with a through axial bore which communicates with the vessel and serves as the nozzle through which the balancing material is ejected. The function of the ejection means is performed by a piston movable in the chamber by means of a mechanism comprising a driving disc and a cam plate, the latter being provided with an exciting coil and a striker. The rod of said piston is arranged in the bore of said cylindrical stem.

The unit for controlling said ejection means is actuated by a signal from a transducer, which transducer monitors the vibration of the supports whereon the rotor rotates.

At the moment when the light point on the rotor surface is in front of the bore, a signal from the support vibration transducer is applied to the control unit and therefrom, to the exciting coil mounted on the cam plate. As a result, the cam plate is attracted to the driving disc, and the striker strikes at the head of the piston whose rod moves in the stem bore and thus ejects a dose of the balancing material onto the surface of the rotor under balancing.

After each ejection, another dose of the balancing material is introduced into the bore of said stem from the vessel, the volume of the dose corresponding to that of the bore.

The disadvantages of the foregoing rotor balancing apparatus are their low productivity, as the employment of mechanical ejection means puts its limitations upon the ejection rate. Another disadvantage of the foregoing type of apparatus resides in the fact that the volume of ejected balancing material doses is constant and cannot be regulated depending on the size of the rotor and the unbalance magnitude thereof, which accounts for comparatively low balancing accuracy.

The disadvantages of the above apparatus include their relatively sophisticated design and a considerable number of movable parts, which affects the operational reliability of such apparatus.

It is an object of the present invention to provide an apparatus for balancing rotors which sharply increases the rate of ejecting doses of a balancing material and thus raises the productivity of the rotor balancing apparatus, and which makes it possible to regulate the balancing material dosage, depending upon the weight and unbalance magnitude of the rotor being balanced and thus raise the accuracy of balancing.

The foregoing and other objects of the present invention are attained by balancing rotors by means of forced application onto the light point area of the rotor surface doses of a liquid, fast-hardening balancing material, which application is carried out until the unbalance magnitude is reduced to a permissible level, each dose of the balancing material being ejected by means of magnetic pulse forces produced by a pulsed electromagnetic field.

The foregoing and other objects of the present invention are also attained by an apparatus comprising a chamber for a balancing material, said chamber having a nozzle; means for ejecting doses of said balancing material in liquid state from said nozzle onto the light point area of a rotor being balanced in the course of its rotation; and a control unit for controlling said ejection means, which control unit is electrically connected to a transducer of rotor rotation parameters. According to the invention, the function of the balancing material ejection means is performed in the proposed apparatus by an electromagnetic inductor in combination with a pulse generator having charge and discharge circuits electrically connected to the output of the control unit, the chamber being arranged in the electromagnetic field of said inductor and constructed so that the arrival of electric pulses from the generator produces therein magnetic pulse forces which eject doses of the balancing material through said nozzle of said chamber.

The use of the proposed rotor balancing apparatus is based upon utilizing the energy of a pulsed magnetic field for ejecting doses of a liquid balancing material, which substantially raises the ejection rate and makes it possible to regulate the volume of an ejected dose, depending upon the unbalance magnitude of the rotor being balanced, which, in turn, ensures high productivity and accuracy of the balancing process as a whole.

In addition, the absence of a great number of movable parts in the apparatus of this invention accounts for its high reliability, compactness and long service life.

The foregoing advantages make it possible to provide all-purpose apparatus for automatic balancing of rotors of machines and mechanisms operating under any temperature and atmospheric conditions, including vacuum, which opens up new horizons in the field of balancing.

In one of the alternative embodiments of the balancing apparatus according to the invention, the chamber body is constructed as a hollow closed cylinder, with a nozzle being installed in one of its end face walls, along the axis of said cylinder, whereas the other end face wall of said cylinder, facing the inductor, is made of a diamagnetic material and is axially movable in the direction of the nozzle under the action of magnetic pulse forces generated in said latter wall.

This makes it possible to use as the balancing material compounds having different physico-mechanical properties, the choice of said compounds depending upon the properties of the material of the rotor being balanced and the atmospheric and temperature conditions.

This accounts for a wider choice of compounds which can be used as the balancing material, as the essential requirements imposed upon said material only include the possibility of maintaining said material in liquid state, its adhesion with the surface of the rotor being balanced, and its hardening time. The balancing material in the apparatus under review may be a molten metal, a resin, an adhesive, a plastic material, etc.

The end face wall of the chamber body, which faces the inductor, may be constructed as a diaphragm.

This makes it possible to provide a structurally simple and reliable means for transmitting the action of magnetic pulse forces to the balancing material, as it rules out skewing and sticking of the diaphragm.

In another embodiment of the proposed apparatus in accordance with the invention, the end face wall of the chamber body, which faces the inductor, is constructed as a piston.

This design makes it possible to utilize for balancing the entire mass of the balancing material filling said chamber and ensures, if necessary, thermal insulation of the interior of said chamber.

In accordance with the latter embodiment, the piston may have two stages entering corresponding cavities provided in the chamber body, the lesser stage of said piston facing the nozzle.

This double-stage piston raises the balancing accuracy due to a decreased dosage of the balancing material being ejected, as well as the initial ejection velocity of the doses, as the double-stage piston acts as a hydraulic actuator which raises the pressure in the chamber cavity which accommodates the lesser stage of the piston, as compared to the pressure developed by magnetic pulse forces and acting upon the greater stage of the piston.

In still another alternative embodiment of the proposed apparatus, the chamber body is made of a magnetically transparent material.

Such an apparatus may be used in case when the balancing material is a magnetic material, wherein induced currents may appear.

In all the foregoing embodiments the nozzle of the chamber may be detachable.

This makes it possible to regulate the productivity and accuracy of the balancing process by altering the flow area of the nozzle, which changes the doses of the balancing material being ejected with a constant energy of the pulsed electromagnetic field.

In addition, this makes it possible to employ nozzles with different geometric configurations for balancing materials having different physico-mechanical properties, for example, materials with different surface tension forces.

Other objects and advantages of the present invention will become more apparent from the following detailed description of preferred embodiments thereof to be read in conjuction with the accompanying drawings, wherein:

FIG. 2 shows the same, in longitudinal section with a chamber having a piston;

FIG. 3 shows the same, in longitudinal section with a chamber made of a magnetically transparent material;

FIG. 4 shows the same, in longitudinal section with a chamber constructed in the form of a silphon and an end-face arrangement of an electromagnetic inductor;

FIG. 5 shows the same, with a chamber constructed in the form of a silphon and a coaxial arrangement of an electromagnetic inductor.

Figure 1:
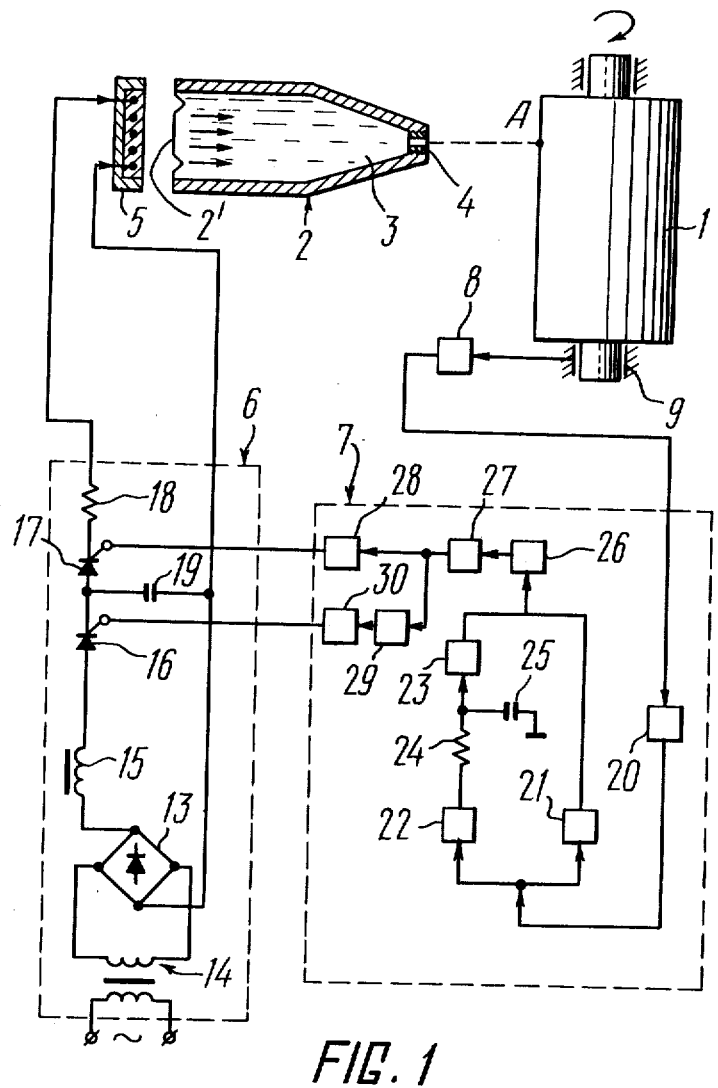
FIG. 1 is a block diagram of a rotor balancing apparatus in accordance with the invention.

The balancing of rotors consists in finding a light point area on the surface of the rotor being balanced and successively applying onto it doses of a liquid, fast-hardening balancing material.

Each dose of said balancing material is applied, in accordance with the invention, by means of magnetic pulse forces produced by a pulsed electromagnetic field. The process is carried on until the unbalance magnitude reaches a permissible level.

The light point area on the surface of the rotor being balanced is found by measuring the vibration parameters of said rotor in the course of its rotation.

Referring now to the attached drawings, the proposed apparatus for balancing a rotor 1 (FIG. 1), in accordance with the invention, comprises a chamber 2 for a balancing material 3, which chamber has a nozzle 4 for ejecting doses of the material 3 onto a light point area A on the surface of the rotor 1 being balanced in the course of its rotation.

In the proposed apparatus the ejection of doses of the balancing material 3 from the nozzle 4 of the chamber 2 is effected, according to the invention, by an electromagnetic inductor 5, the chamber 2 being arranged in the magnetic field of said inductor 5.

The electromagnetic inductor 5 is connected to a discharge circuit of the pulse generator 6 generating high-voltage pulses by a signal from a control unit 7, said generator being connected to the output of said control unit. Connected to the input of the control unit 7 is a transducer 8 of vibration parameters of supports 9, rotatably mounted whereon, opposite the nozzle 4 of the chamber 2, is the rotor 1 being balanced.

The body of the chamber 2 is constructed as a hollow closed cylinder extending on one side into a conical projection coaxial with said chamber body, the nozzle 4 being installed at the apex of the projection, coaxially with the chamber 2.

In one of the embodiments of the proposed apparatus the end face wall of the chamber 2, which is opposite the nozzle 4, faces the electromagnetic inductor 5 and is constructed, according to the invention, as a diaphragm 2' from a diamagnetic material, for example, bronze.

As electric pulses arrive from the electromagnetic inductor 5, there appear induced currents in the diaphragm 2', the interaction of said induced currents with the currents of the inductor producing in the diaphragm 2' magnetic pulse forces directed towards the nozzle 4, which forces bring about deformation of the diaphragm 2'. The deformation of the diaphragm 2' results in an ejection of a dose of the balancing material 3 from the nozzle 4 of the chamber 2.

The diaphragm 2 is extremely easy to manufacture and highly reliable in operation, as its deformation does not involve any skewing or seizing.

However, the diaphragm 2' does not make it possible to use the entire mass of the liquid balancing material 3 filling the chamber 2, as the magnitude of deformation of the diaphragm 2' is limited.

In addition, when using the balancing materials 3 which maintain their liquid state only at increased temperatures, the use of the diaphragm 2' makes it difficult to ensure sufficiently reliable thermal insulation of the interior of the chamber 2.

In such cases the diaphragm 2' is replaced, in accordance with the invention, by a piston 10 (FIG. 2) whose movement along the axis of the chamber 2 makes it possible to use for balancing the rotor 1 the entire mass of the balancing material 3 filling the chamber 2.

If necessary, the piston 10 may be made from a composite material comprising an element 10a of a diamagnetic material and a thermally insulating insert 10b to ensure thermal insulation of the interior of the chamber 2.

In order to ensure greater accuracy of balancing the rotor 1 by decreasing each ejected dose of the balancing material 3 and raising the initial velocity of the ejected doses, in one of the alternative embodiments of the apparatus the piston 10 has two stages and is disposed so that its lesser stage 10c enters the corresponding cavity of the chamber 2 on the side of the nozzle 4, which cavity is filled with the balancing material 3.

The double-stage piston 10 acts as a hydraulic actuator, as it raises the pressure exerted by its lesser stage 10c upon the balancing material 3, as compared to the pressure exerted by the magnetic pulse forces upon its greater stage 10a, thus increasing the initial velocity of ejecting a dose of the balancing material with simultaneously reducing the mass of each dose.

The pressure rise coefficient in this case is equal to the ratio between the areas of the greater stage 10a and the lesser stage 10c of the piston 10; the difference between these areas is in direct proportion to the reduction of the ejected dose of the balancing material, which correspondingly raises the balancing accuracy.

If the balancing material is a material wherein induced currents may appear, for example, a metal, the body of the chamber 2 may be made of a magnetically transparent material, as is shown in FIG. 3.

This provides for the simplest and the most reliable apparatus.

In cases when the balancing material maintains its liquid state at an increased temperature, the chamber 2 is enveloped by a jacket accommodating heating means constructed as an electric heater 11 (FIG. 2).

In all the foregoing embodiments of the rotor balancing apparatus, the electromagnetic inductor 5 is disc-shaped and arranged coaxially with the chamber 2.

There may be, however, other embodiments of the chamber 2 for the balancing material 3 and of the electromagnetic inductor 5. For example, FIG. 4 shows a chamber whose body is constructed as a silphon 12 deformable under the action of pulse forces appearing therein.

In FIG. 5 the same chamber is encircled by the annular electromagnetic inductor 5.

All the above embodiments of the rotor balancing apparatus of the present invention have the same electric circuit (FIG. 1) whose detailed description is given hereinbelow.

The pulse generator 6 comprises a rectifier 13. Connected in parallel with the input of said rectifier 13 is the step-up winding of a mains-powered transformer 14. Connected to the output of said rectifier 13, via two parallel circuits, is the electromagnetic inductor 5. One of said circuits includes, in series connection, an inductance coil 15, two switching means in the form of thyristors 16 and 17, and a resistor 18. Connected in parallel with said circuits is a capacitor storage 19.

The transformer 14, rectifier 13, inductance coil 15, thyristor 16 and capacitor storage 19 form a charging circuit of the pulse generator 6. The capacitor storage 19, thyristor 17, resistor 18 and the electromagnetic inductor 5 make up a discharge circuit of the generator 6.

The unit 7 for controlling the pulse generator 6 comprises an amplifier 20 whose input is connected to the transducer 8 and output to, two parallel circuits, the first of these circuits being a threshold element in the form of a flip-flop 21, whereas the second circuit includes flip-flops 22 and 23 interconnected in parallel, with a resistor 24 and a capacitor 25 connected in parallel between said flip-flops, said resistor 24 and capacitor 25 forming an integrating circuit.

The outputs of the flip-flops 21 and 23 are connected to the input of a comparison unit 26 for comparing signals of said flip-flops 21 and 23, said comparison unit 26 also being constructed as a flip-flop whose output is connected to the input of a pulse counter 27 which is also built around flip-flops.

The outputs of the flip-flop 27 are connected to the control electrodes of the thyristors 16 and 17 of the pulse generator 6 via two parallel circuits. The first of these circuits includes an amplifier 28, whereas the second circuit includes, in series connection, a signal delay unit 29 constructed as a univibrator, and an amplifier 30.

The signal delay unit 29 has a time constant which is in excess of the discharge time of the pulse generator 6.

The above circuitry of the pulse generator 6 and the control unit 7 makes it possible to automate the operation of the proposed apparatus so that with an unbalance magnitude of the rotor 1 being in excess of the permissible level the apparatus operates continuously and is switched off after the end of balancing.

Electric pulses are applied to the electromagnetic inductor 5 to produce magnetic pulse forces and the ejection of doses of the balancing material 3 from the nozzle 4 of the chamber 2 at the moments when the light point area A of the surface of the rotor 1 being balanced is in a predetermined position with respect to the axis of the nozzle 4; the charging of the pulse generator 6 begins only after the processes taking place in its discharge circuit have ended.

The foregoing circuit of the control unit 7 makes it possible to raise the balancing accuracy, as it ensures the arrival of a signal which opens the discharge circuit of the pulse generator 6 and effects the ejection of doses of the balancing material 3 with a uniform preselected position of the light point area A on the surface of the rotor 1 relative to the axis of the nozzle 4 of the chamber 2 irrespective of the amplitude value of the signal of the transducer 8 of vibration parameters of the rotor 1.

The presence in the circuitry of the control unit 7 of the pulse counter 27 makes it possible to effect a single ejection of the balancing material 3 per several rotations of the rotor 1, which raises the balancing accuracy due to eliminating the effects of forced oscillations of the rotor 1 upon the signals of the transducer 8, which forced oscillations are caused by the impact of the doses of the balancing material 3 applied onto the surface of the rotor 1.

The proposed rotor balancing apparatus operates as follows.

As the pulse generator 6 is connected to a.c. mains, with the thyristor 16 conducting, the capacitor 19 is charged (via the transformer 14, rectifier 13, inductance coil 15 and thyristor 16). As the charge current passes through zero, the thyristor 16 becomes non-conducting, and the capacitor 19 is charged, due to the presence in said circuit of the inductance coil 15, to almost double the voltage across the rectifier 13. The generator 6 is thus ready for action.

In the course of rotation of the rotor 1 being balanced, said rotor being mounted on the supports 9, the transducer 8 of vibration parameters of said supports 9 sends out a sinusoidal signal whose amplitude is determined by the vibration parameters of said supports 9, which parameters are proportional to the unbalance magnitude of the rotor 1. The maximum and minimum of the signals of the transducer 8 correspond to the "heavy" and light point areas on the surface of the rotor 1 being balanced.

From the transducer 8 the signal is applied via the amplifier 20 to the flip-flop 21 which is a threshold element, wherein the signal from the transducer 8 is compared to a voltage corresponding to a permissible unbalance magnitude of the rotor.

If the unbalance magnitude of the rotor 1 is in excess of a permissible level, there is applied a signal to the flip-flop 21, which signal is in excess of the actuating threshold. The flip-flop 21 becomes conducting and sends out a square signal.

With voltage equal to the enabling voltage, the flip-flop 21 becomes non-conducting. Yet with different amplitudes of the signal from the transducer 8, there will be certain variations in the response time of the flip-flop 21, which may affect the balancing accuracy.

In order to rule out this possibility, provision is made for a second electric circuit, parallel to said first circuit, which second circuit includes the flip-flop 22 which also receives a signal from the transducer 8. The flip-flop 22 is actuated by a low voltage, so that the width of its output pulse is almost equal to the width of the positive half-wave width of the sinusoid arriving from the transducer 8 via the amplifier 20.

From the flip-flop 22 the square signal is applied to the integrating circuit formed by the resistor 24 and capacitor 25, the output voltage of said circuit making the flip-flop 23 conducting. The actuating threshold of the flip-flop 23 is selected so that said flip-flop becomes conducting with a maximum value of the signal from the transducer 8, regardless of the absolute value of that signal.

From the flip-flops 21 and 23 the signals are applied to the comparison unit 26 for comparing said signals, which unit 26 becomes conducting only in the presence of signals at the outputs of both the flip-flop 21 and the flip-flop 23. Thus, an instruction is given with a uniform vibration phase of the rotor 1 being balanced, which phase corresponds to the moment the light point area A of the surface of the rotor 1 is in front of the nozzle 4 of the chamber 2.

In order to eliminate the effects of the forced oscillations of the rotor 1 upon the balancing accuracy, which forced oscillations are caused by the impact of the doses of the balancing material 3 applied onto the surface of said rotor 1, there is only effected a single ejection of the balancing material 3 per several rotations of the rotor 1. Hence, pulse signals from the comparison unit 26 are applied to the counter 27 at whose output there appears a single pulse after the arrival of a predetermined number of pulses to its input.

From the pulse counter 27 the pulse is applied via the amplifier 28 to the thyristor 17 which becomes conducting and passes the discharge current from the capacitor 19 via the resistor 18 to the electromagnetic inductor 5.

As the discharge current flows through the electromagnetic inductor 5, there appear induced currents in the chamber 2, which induced currents interact with the currents in the inductor 5 and produce electromagnetic forces directed towards the nozzle 4. Under the action of these forces the diaphragm 2' is deflected, and a dose of the balancing material 3 is ejected from the chamber 2 through the nozzle 4 onto the surface of the rotating rotor 1 at the moment when the light point area A is in front of the axis of the nozzle 4. Each ejected dose of the liquid balancing material 3 adheres to the light point area A of the rotor 1 and hardens there, thereby reducing the unbalance of said rotor 1.

Upon the end of the discharge of the capacitor 19, the thyristor 17 becomes non-conducting. Simultaneously with the arrival of a pulse which enables said thyristor 17, there is applied a pulse via the delay unit 29 and the amplifier 28 to the control electrode of the thyristor 16. As this takes place, the delay unit 29 makes the thyristor 16 conducting and ensures the beginning of the charging of the capacitor 19 only after the processes taking place in the discharge circuit of the pulse generator 6 are over.

The process of ejecting doses of the liquid balancing material 3 onto the surface of the rotor 1 being balanced is cyclically repeated until the unbalance magnitude of said rotor 1 is brought down below the permissible level. As this takes place, the signal applied from the transducer 8 via the amplifier 20 to the flip-flop 21 becomes less than the actuating voltage of the latter. As a result, said flip-flop 21 remains non-conducting; the actuating signal is no longer applied to the thyristor 17, and the process of balancing the rotor 1 is thus ended.

What is claimed is:

1. An apparatus for balancing rotors, comprising: a chamber for a balancing material, said chamber having a nozzle; an electromagnetic inductor, said chamber being arranged in the magnetic field thereof; a pulse generator having a charge circuit and a discharge circuit, said electromagnetic inductor being connected to the latter and receiving electric pulses therefrom; a control unit, said charge circuit and said discharge circuit of said electromagnetic inductor being connected to the output of said control unit; a transducer of vibration parameters of a rotor being balanced in the course of its rotation, said transducer being connected to the input of said control unit; said chamber being constructed so that upon the arrival at said electromagnetic inductor of electric pulses from said pulse generator and according to an instruction from said control unit, there are produced in said chamber magnetic pulse forces which eject doses of the balancing material from the nozzle of said chamber onto the light point area of the surface of the rotor being balanced in the course of its rotation.

2. The apparatus as defined in claim 1, wherein said chamber is constructed as a hollow closed cylinder, said nozzle being installed in one of the end face walls of said cylinder, whereas the other end face wall of said cylinder, facing the electromagnetic inductor, is made from a diamagnetic material and adapted for axial movement in the direction of the nozzle under the action of magnetic pulse forces produced in said wall.

3. The apparatus as defined in claim 2, wherein the end face wall of the chamber body, facing the electromagnetic inductor, is constructed as a diaphragm.

4. The apparatus as defined in claim 2, wherein the end face wall of the chamber body, facing the electromagnetic inductor, is constructed as a piston.

5. The apparatus as defined in claim 4, wherein the piston has two stages entering corresponding cavities provided in the chamber, the lesser stage of said piston facing the nozzle.

6. The apparatus as defined in claim 1, wherein the chamber is made from a magnetically transparent material, magnetic pulse forces being generated in the magnetic balancing material itself.

7. The apparatus as defined in claim 1, wherein the nozzle is detachable.

* * * * *